US009388288B2

(12) United States Patent
Vanier et al.

(10) Patent No.: US 9,388,288 B2
(45) Date of Patent: Jul. 12, 2016

(54) OPACIFYING PARTICLES WITH INTERNAL VOID AND METHODS FOR MAKING THE SAME

(71) Applicant: PPG Industries Ohio, Inc., Cleveland, OH (US)

(72) Inventors: Noel Vanier, Wexford, PA (US); Xiangling Xu, Pittsburgh, PA (US); Wei Wang, Allison Park, PA (US); Shanti Swarup, Allison Park, PA (US); Michael Pawlik, Glenshaw, PA (US); David Asay, Sarver, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 208 days.

(21) Appl. No.: 13/783,697

(22) Filed: Mar. 4, 2013

(65) Prior Publication Data
US 2014/0249241 A1    Sep. 4, 2014

(51) Int. Cl.
C08J 9/00      (2006.01)
C08F 2/00      (2006.01)
C08F 2/44      (2006.01)
C08F 292/00    (2006.01)
C09J 151/10    (2006.01)
(Continued)

(52) U.S. Cl.
CPC .............. C08J 9/0061 (2013.01); C08F 2/001 (2013.01); C08F 2/44 (2013.01); C08F 292/00 (2013.01); C09J 151/10 (2013.01); C01G 23/047 (2013.01); C08F 2/24 (2013.01); C08F 2500/24 (2013.01); C09C 1/0084 (2013.01)

(58) Field of Classification Search
CPC ..................................................... C08J 9/0061
See application file for complete search history.

(56) References Cited

U.S. PATENT DOCUMENTS

2006/0009546 A1*  1/2006  Brown ........................ 523/212
2006/0009587 A1   1/2006  Kim et al.
2011/0196088 A1   8/2011  Hawkett et al.
2013/0087736 A1*  4/2013  Baker et al. ............... 252/62.54

FOREIGN PATENT DOCUMENTS

CN    102311556 A    1/2012
CN    102391410 A    3/2012
(Continued)

OTHER PUBLICATIONS

Nguyen, D. et al., Polymer-TiO2 Composite Nanorattles via RAFT-Mediated Emulsion Polymerization, Journal of Polymer Science Part A: Polymer Chemistry, 2011, pp. 1-7.
(Continued)

Primary Examiner — Mike M Dollinger
Assistant Examiner — Christina Wales
(74) Attorney, Agent, or Firm — Julie W. Meder

(57) ABSTRACT

The invention includes a method of preparing an aqueous dispersion of particles at least partially encapsulated by a polymer, the method comprising dispersing inorganic particles in an aqueous phase; functionalizing at least a portion of the surfaces of the inorganic particles with a coupling agent, the coupling agent having pendent reactive groups; polymerizing the reactive groups on the functionalized particles with a first polymerizable component to produce inner polymer shells surrounding the inorganic particles; polymerizing a second polymerizable component to form outer polymer shells at least partially encapsulating the inner polymer shells; and producing voids within the outer polymer shells, such that the inorganic particles are received within the voids.

18 Claims, 1 Drawing Sheet

(51) Int. Cl.
  *C01G 23/047*    (2006.01)
  *C09C 1/00*      (2006.01)
  *C08F 2/24*      (2006.01)

(56) References Cited

FOREIGN PATENT DOCUMENTS

WO          2011006608  A1      1/2011
WO    WO  2011066608  A1  *   6/2011

OTHER PUBLICATIONS

Ross, W., Theoretical Light-Scattering Power of TiO2 and Microvoids, Ind. Eng. Chem., Prod. Res. Develop., 1974, pp. 45-49, vol. 13, No. 1.

Xu, X. et al., Synthesis and Utilization of Monodisperse Hollow Polymeric Particles in Photonic Crystals, Journal of the American Chemical Society, 2004, pp. 7940-7945, vol. 126.

* cited by examiner

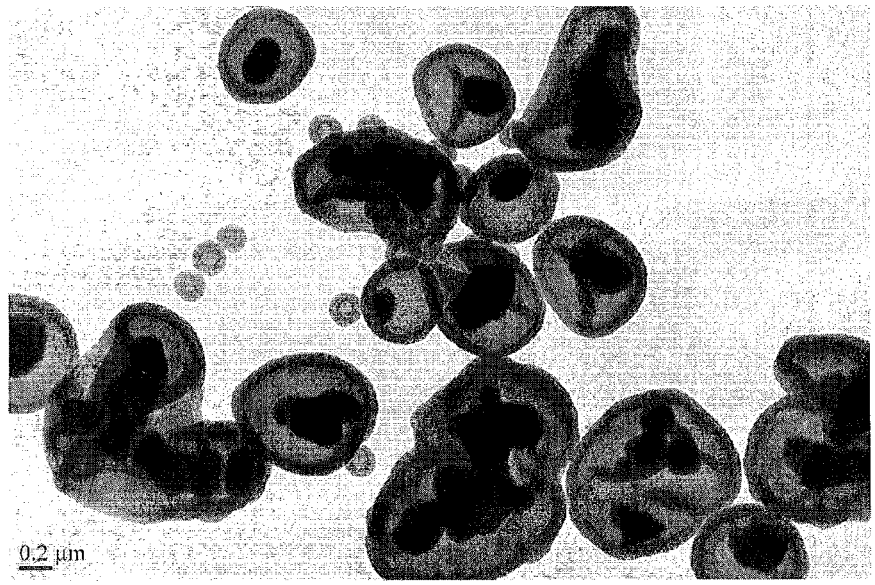
FIG. 1
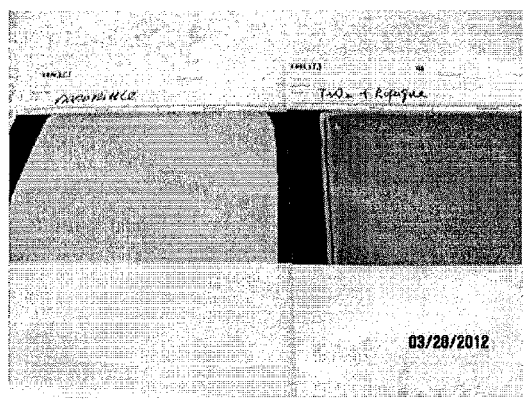 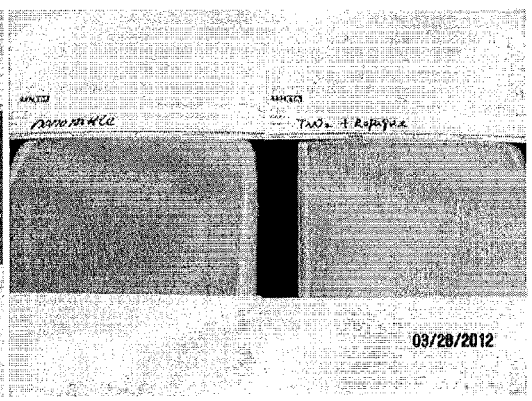
FIG. 2A  FIG. 2B

OPACIFYING PARTICLES WITH INTERNAL VOID AND METHODS FOR MAKING THE SAME

FIELD OF THE INVENTION

This invention relates to opacifying particles used in coating compositions. In particular, this invention relates to opacifying particles with internal voids produced in a multi-stage polymerization process.

BACKGROUND OF THE INVENTION

Scattering pigments are commonly used in coating compositions to achieve opacity in both aqueous systems and non-aqueous systems. Titanium dioxide is commonly used as an opacifying pigment. One limitation in the use of titanium dioxide in aqueous coating compositions is that some of the pigment tends to aggregate. Any aggregation of pigment reduces the efficiency with which it can scatter light. This problem has been minimized in the past by use of surfactants and various dispersion techniques or low cost extenders added to the coating composition to create space between the individual titanium dioxide pigment particles. In other applications, pigment particles have been encapsulated within polymer to create a physical barrier between individual pigment particles and exhibit better dispersion within a polymer system due to the greater compatibility of the polymer enclosed particle than with the polymer system than the pigment particle itself.

More recently, the cost for producing titanium dioxide ($TiO_2$) has increased. Increased cost continues to drive an effort to minimize the amount of titanium dioxide used in coating compositions. One option for extending the amount of $TiO_2$ used in the coating composition is to include $TiO_2$ pigment particles incorporated into hollow particles that also include air voids. These types of particles exhibit enhanced scattering compared to similarly sized $TiO_2$ particles.

SUMMARY OF THE INVENTION

The present invention includes a method of preparing an aqueous dispersion of particles at least partially encapsulated by a polymer, the method comprising dispersing inorganic particles in an aqueous phase; functionalizing at least a portion of the surfaces of the inorganic particles with a coupling agent, the coupling agent having pendent reactive groups; polymerizing the reactive groups on the functionalized particles with a first polymerizable component to produce inner polymer shells surrounding the inorganic particles; polymerizing a second polymerizable component to form outer polymer shells at least partially encapsulating the inner polymer shells; and producing voids within the outer polymer shells, such that the inorganic particles are received within the voids. Also included in the present invention is an aqueous dispersion of particles comprising inorganic particles at least partially encapsulated by polymerized inner shells, wherein at least a portion of the surfaces of the particles comprise a coupling agent having pendent reactive groups, and wherein the inner shells are prepared from a reaction of the coupling agent pendent reactive groups with ethylenically unsaturated monomers and outer polymer shells at least partially encapsulating the inner polymer shells, wherein the outer polymer shells are at least partially spaced apart from the inner polymer shells, thereby defining voids within the outer polymer shells.

BRIEF DESCRIPTION OF THE DRAWINGS

FIG. 1 is a transmission electron microscope (TEM) image of particles produced according to one embodiment of the present invention;

FIG. 2a is a photograph of a coating composition containing particles of the present invention and prior art particles, in a wet state; and FIG. 2b is a photograph of a coating composition containing particles of the present invention and prior art particles, in a dry state.

DETAILED DESCRIPTION OF THE INVENTION

For purposes of the following detailed description, it is to be understood that the invention may assume various alternative variations and step sequences, except where expressly specified to the contrary. Moreover, other than in any operating examples or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The opacifying particles of the present invention include multi-staged opacifying particles including inorganic particles that are encapsulated by polymeric shells. As used herein, the term "encapsulated" and the like encompasses at least partially encapsulated or fully encapsulated unless indicated otherwise. At least a portion of the surfaces of the inorganic particles is functionalized with a coupling agent having pendent reactive groups. A polymer layer is produced on the functionalized particle surfaces by reaction of the coupling agent pendent reactive groups with ethylenically unsaturated monomers, yielding seed-core particles. At least one outer polymer shell encapsulates the inner shells with the particles received therein. The outer polymer shells are spaced from the inner particle shells, thereby defining voids within the outer polymer shell. As such, the opacifying particles of the present invention include outer polymer shells that encapsulate a void as well as inorganic particles that are encapsulated by polymerized inner shells. The core of the multi-staged opacifying particles includes inorganic particles, specifically pigment particles such as $TiO_2$. Other suitable inorganic particles that may be received within the core include ZnO, $ZnO_2$, PbO, ZnSi, $ZnSiO_4$, ZnS or $ZnSe_2$. Each of these materials has a high refractive index (e.g., over 1.65).

In one embodiment, the inorganic particles are encapsulated in an inner shell. The particle-inner shell structure is referred to herein as a seed-core particle, onto which subsequent polymer layers are deposited. To produce the seed-core particles, the inorganic particles are treated with a coupling agent to functionalize at least a portion of the surface of the inorganic particles with a coupling agent bearing pendant reactive groups. In one embodiment, the coupling agent may include a methoxysilane, such as methacryloxypropoyltrimethoxy silane, vinyltrimethoxysilane, vinyltriethoxysilane, methacryloxypropyl methyldimethoxysilane, methacryloxypropyl methyldiethoxysilane, methacryloxypropyl triethoxysilane, or acryloxypropyl trimethoxysilane. The coupling agent of the present invention includes reactive pendant groups, such as reactive groups comprising ethylenic unsaturation. The ethylenic unsaturation of the pendant reactive groups of the coupling agent are then reacted with a first polymerizable component also comprising ethylenic unsaturation. In another embodiment, the coupling agent may instead include a hydrophobic organic component (without ethylenic unsaturation) to which monomers for producing the core polymer shell adsorb and are subsequently polymerized to form the core polymer shell. Suitable monoethylenically unsaturated monomers useful for making the core polymer include monoethylenically unsaturated monomers containing acid-functionality such as monomers containing at least one carboxylic acid group including (meth)acrylic acid ("(meth)acrylic" herein meaning acrylic or methacrylic), (meth)acryloxypropionic acid, itaconic acid, aconitic acid, maleic acid, fumaric acid, crotonic acid, monomethyl maleate, monomethyl fumarate, monomethyl itaconate and the like. Acid precursors such as anhydrides, for example maleic anhydride, are included. Acrylic acid and methacrylic acid are particularly suited for use as the first polymerizable component. Other suitable first polymerization components for producing the seed-core particles include nonpolymeric compounds containing at least one carboxylic acid group including $C_6$-$C_{12}$ aliphatic or aromatic monocarboxylic acids and dicarboxylic acids, such as benzoic acid, m-toluic acid, p-chlorobenzoic acid, o-acetoxybenzoic acid, azelaic acid, sebacic acid, octanoic acid, cyclohexanecarboxylic acid, lauric acid and monobutyl phthalate and the like.

The core polymer shell may be made in a single stage or step of sequential polymerization or be made by a plurality of steps in sequence. In one embodiment, a water soluble free radical initiator is utilized in the aqueous emulsion polymerization. Suitable water soluble free radical initiators include ammonium persulfate, hydrogen peroxide, tert-butyl peroxide, alkylide metals such as sodium potassium and lithium persulfate, and mixtures of such an initiator with a reducing agent such as a sulfite. The temperature may be in the range of 10° C. to 100° C. In the case of persulfate systems, the temperature is preferably in the range of 60° C. to 90° C.

A nonionic or anionic emulsifier may be used, either alone or together. Examples of suitable nonionic types of emulsifiers include tert-octylphenoxyethylpoly(39)-ethoxyethanol, polyethylene glycol 2000 monooleate, ethoxylated castor oil, block copolymers of propylene oxide and ethylene oxide, polyoxyethylene(20) sorbitan monolaurate and nonylphenoxyethyl-poly(40)ethoxyethanol. Examples of suitable anionic emulsifiers include sodium lauryl sulfate, sodium dodecylbenzenesulfonate, sodium lauryl ether sulfate, sodium alpha-olefin ($C_{14}$-$C_{16}$) sulfonate, ammonium or alkali metal salts of sulfosuccinate derivatives, ammonium or alkali metal salts of fatty acids such as stearic acid, linseed oil fatty acid, and coconut oil fatty acid, ammonium or alkali metal salts of phosphate esters of ethoxylated nonylphenol and tert-octylphenoxyethoxypoly(39)ethoxyethyl sulfate.

Upon reaction of the first polymerizable component with the coupling agent pendant reactive groups, the inorganic particles are encapsulated in a core polymer shell, which may be hydrophilic, thereafter serving as seed-core particles. The phrase "seed-core particles" means an aqueous emulsion polymer dispersion that includes the inorganic particles encapsulated in core polymer shells. Thereafter, the seed-core particles are subsequently encapsulated in subsequent shells in emulsion polymerization processes by deposition thereon of polymerized products of one or more successive monomer charges introduced to a medium containing the dispersed seed-core particles in one or more subsequent stages.

At least one outer shell is deposited onto the seed-core particles to at least partially encapsulate the seed-core particles. In one embodiment, one or more of the outer shells are hydrophilic at least at some pH to enhance subsequent swelling thereof. The outer shells may be produced from nonionic monoethylenically unsaturated monomers such as styrene, a-methyl styrene, vinyltoluene, ethylene, vinyl acetate, vinyl chloride, vinylidene chloride, acrylonitrile, (meth)acrylamide, ($C_1$-$C_{20}$) alkyl or ($C_3$-$C_{20}$) alkenyl esters of (meth) acrylic acid, such as methyl (meth)acrylate, ethyl (meth)acrylate, butyl (meth)acrylate, 2-ethylhexyl (meth)acrylate, benzyl (meth)acrylate, lauryl (meth)acrylate, oleyl (meth) acrylate, palmityl (meth)acrylate, stearyl (meth)acrylate and the like.

Polyethylenically unsaturated monomers that can be used in preparing the outer shells include alkylene glycol diacrylates and dimethacrylates, such as for example, ethylene glycol diacrylate; ethylene glycol dimethacrylate; 1,3-butylene glycol diacrylate; 1,4-butylene glycol diacrylate propylene glycol diacrylate and triethylene glycol dimethylacrylate; 1,3-glycerol dimethacrylate; 1,1,1-trimethylol propane dimethacrylate; 1,1,1-trimethylol ethane diacrylate; pentaerythritol trimethacrylate; 1,2,6-hexane triacrylate; sorbitol pentamethacrylate; methylene bis-acrylamide; methylene bis-methacrylamide; divinyl benzene; vinyl methacrylate; vinyl crotonate; vinyl acrylate; vinyl acetylene; trivinyl benzene; triallyl cyanurate; divinyl acetyl divinyl ethane; divinyl sulfide; divinyl ether; divinyl sulfone; diallyl cyanamide; ethylene glycol divinyl ether; diallyl phthalate; divinyl dimethyl silane; glycerol trivinyl ether; divinyl adipate; dicyclopentenyl (meth)acrylates; dicyclopentenyloxy (meth)acrylates; unsaturated esters of glycol monodicyclopentenyl ethers; allyl esters of α,β-unsaturated mono- and dicarboxylic acids having terminal ethylenic unsaturation including allyl methacrylate; allyl acrylate; diallyl maleate; diallyl fumarate; diallyl itaconate and the like.

Polymerization of the at least one outer shell onto the seed-core particle may be formed in the same reaction vessel in which the seed-core particles were produced or the reaction medium containing the dispersed seed-core particles may be transferred to another reaction container. In one embodiment, the monomers used in producing each of the outer shell polymers are first combined in pre-emulsions which are then sequentially charged into the container containing the seed-core particles. In one embodiment, a plurality of outer shells are applied sequentially to the seed-core particles yielding a multistage polymer-encapsulated particle, with a final outer shell produced from nonionic monoethylenically unsaturated monomers and polyethylenically unsaturated monomers. In general, the seed-core particles include hydrophilic exterior surfaces, and the shells deposited thereon are progressively less hydrophilic, typically resulting in a hydrophobic outermost shell.

The outer most shell may be produced by hydrophobic, higher $T_G$ monomers such as styrene, vinylchloride or methylmethacrylate and mixtures thereof, crosslinked with a suitable crosslinking agent such as ethylene glycol dimethacrylate.

The amount of polymer deposited to form the plurality of outer shells is generally such as to provide an overall size of the opacifying particle of 100 to 2500 nanometers, such as 200 to 1500 nanometers, in unswollen condition (that is, before any neutralization to raise the pH to 6 or higher). In one embodiment where the opacifying particles include three outer shells, each of the first and second outer shells are at least 15%, preferably at least 20%, by weight of the total of all three outer shell polymers.

Voids are produced in the multistage polymer-encapsulated particle by adding a suitable swelling agent to which the final hydrophobic shell polymer is permeable. For example, the outer shells may be swollen with a conjugate base and a solvent, which permeates through the shell polymers. The swollen multistaged polymer-encapsulated particles are then dried. The composition of the polymer of the core polymer shell and at least the hydrophilic outer shells may be selected to allow for swelling thereof while the composition of the outermost shell may be selected so as to be permeable to an aqueous or gaseous volatile or fixed basic swellant for the hydrophilic polymers of the internal shells and provide stability to a final dispersion of the opacifying particles.

The hydrophilic polymers of the multistage polymer-encapsulated particle are swollen when the particles are subjected to a basic swelling agent that permeates the outermost shell to at least partially neutralize (to a pH of at least 6 to 10) the hydrophilic-functionality of the seed-core polymer and at least one hydrophilic outer shell and thereby to cause swelling by hydration of both the core polymer shell and at least one hydrophilic outer shell. Nonlimiting examples of swelling agents include volatile bases such as ammonia, ammonium hydroxide, and volatile lower aliphatic amines, such as morpholine, trimethylamine, and triethylamine, and the like; and fixed or permanent bases such as potassium hydroxide, lithium hydroxide, zinc ammonium complex, copper ammonium complex, silver ammonium complex, strontium hydroxide, barium hydroxide and the like. When in an aqueous dispersion, swelling of the core polymer shell and at least one hydrophilic shell results in a net flow of water into the particles, thereby swelling the hydrophilic polymers. When the swelling agent is neutralized (e.g. by addition of a neutralizing agent such as hydrogen peroxide) and the particles are dried, the hydrophilic polymers shrink. The shrinkage of the core polymer shell and at least one outer shell develops a void between the hydrophilic shells and the hydrophobic outer shell. The extent of the voids depends in part upon the resistance of the shells to restoration to their previous sizes. By "void" it is meant a polymer-free space, typically filled with water in the aqueous dispersion and with air in the dried hollow sphere pigment. After swelling, the outermost shell is crosslinked to yield opacifying particles comprising a polymer encapsulated pigment ($TiO_2$) received within a seed-core shell, with voids between the outermost shell and the polymer encapsulated pigment. In one embodiment, the polymer encapsulated pigment is free to move within the outer shell (may be referred to as "rattling" within the outer shell) or the polymer encapsulated pigment particles may adhere to an inner surface of the outer shell. In either such an arrangement, the presence of air surrounding or partially surrounding the polymer encapsulated pigment particle results in refractive index contrast that enhances the hiding ability of the particles.

In one embodiment, the opacifying particles are provided in an aqueous dispersion of opacifying particles. As described above, the opacifying particles comprises inorganic particles at least partially encapsulated by polymerized inner shells, wherein at least a portion of the surfaces of the particles comprise a coupling agent having pendent reactive groups, and wherein the inner shells are prepared from a reaction of the coupling agent pendent reactive groups with ethylenically unsaturated monomers and further encapsulated by outer polymer shells at least partially encapsulating the inner polymer shells, wherein the outer polymer shells are at least partially spaced apart from the inner polymer shells, thereby defining voids within the outer polymer shells.

The opacifying particles and aqueous dispersion thereof according to the present invention are particularly suited for use in coating compositions containing a waterborne resinous binder and may also be solvent based. It has been found that the opacifying particles of the present invention provide similar or enhanced hiding in coatings compositions, such as paints, and improved hiding in wet paint, as compared to traditional hiding pigments ($TiO_2$).

The following examples are presented to demonstrate the general principles of the invention. The invention should not be considered as limited to the specific examples presented. All parts are by weight unless otherwise indicated.

EXAMPLES

Example 1

Seed-core Particles $TiO_2$ pigment particles were coated with alkali-swellable polymer shells as follows. Deionized (DI) water (800 g), 150 g $TiO_2$ slurry (TRONOX® CR-826 available from TRONOX Limited, 2.5 g Disponil A 1080 (an emulsifier, available from BASF), 2.5 g Disponil FES-993 (an emulsifier, available from BASF) and 3 g 30% ammonia aqueous solution were first charged into a four necked round bottom flask fitted with a thermocouple, mechanical stirrer, and condenser, and then heated up to 80° C. under an $N_2$ blanket. Once the temperature reached 80° C., a mixture of 12 g of Silquest A174NT (methacryloxypropoyltrimethoxy silane), 20 g methyl methacrylate (MMA) and 1 g of Sipomer PAM 200 (an emulsifier, available from Rhodia) were charged into the flask over 30 minutes. After 30 minutes holding, a mixture of 1.5 g of ammonium persulfate and 18 g of DI water was charged into the flask all at once and held at 30 minutes. After holding was completed, a pre-emulsion of 90 g of DI water, 2 g of SR 550 (methoxy polyethylene glycol (350) monomethacrylate, available from Sartomer), 5.0 g of Disponil A 1080, 6 g of Disponil FES 993, 45 g of methacrylic acid (MAA) and 115 g of MMA, was charged into the flask over 2 hours. After the charge was completed, it was held at 80° C. for an additional 1 hour before being cooled down to room temperature.

Example 2

Opacifying particles with $TiO_2$ in the center were prepared using the seed-core particles produced in Example 1 as follows. DI water (4340 g) was first charged into a four necked round bottom flask fitted with a thermocouple, mechanical stirrer, and condenser, and then heated up to 85° C. under $N_2$ blanket. Once the temperature reached 85° C., a mixture of 4.4 g of ammonium persulfate and 62.5 g of DI water was charged into the flask, and then 720 g of the seed-core latex of Example 1 was charged into the flask. The mixture was held at 77° C. for 10 minutes.

Three shells were formed over the seed-core particles by first charging into the flask (over 30 minutes) a first monomer charge of a pre-emulsion of 160 g of DI water, 3.8 g of sodium dodecylbenzenesulfonate (SDBS), 9.4 g of MAA, 62.5 g of MMA, 1.8 g of ethyleneglycol dimethacrylate (EGDMA) and 87.5 g of styrene. Immediately after the first monomer charge was completed, a second monomer charge of a pre-emulsion of 531 g of DI water, 4.7 g of ammonium persulfate, 6.9 g of SDBS, 12.0 g of MAA, 47 g of EGDMA and 1375 g of styrene, was charged over 90 minutes into the flask. After that, the mixture was heated up to 90° C., and held at 90° C. for 15 minutes. After holding, a third monomer charge of a pre-emulsion of 375 g of DI water, 3.75 g of SDBS, 31.2 g of Disponil A1080, 63 g of EGDMA, and 250 g of styrene, was charged into the flask over 10 minutes.

The seed-core and first shell were swollen by neutralization with a base. A mixture of 106 g of 30% ammonia solution and 281 g of DI water was charged into the flask over 15 minutes, and held at 90° C. for 45 minutes to swell the seed core and shells of the latex particles. The latex was cooled down to 77° C., and a mixture of 6.0 g of t-butyl hydroperoxide (70%) and 62.0 g of DI water was charged into the flask all at once. A mixture of 6.0 g of ascorbic acid and 120.0 g of DI water was then charged over 15 minutes to polymerize the styrene in the shells.

The resultant latex was further centrifuged at 2500 rpm for 15 minutes to separate the voided opacifying particles from the dispersion. The voided structure, with the $TiO_2$ pigment particles in air voids (nanorattles containing $TiO_2$), was confirmed by TEM (FIG. 1). Further analysis indicated that $TiO_2$/polymer weight ratio is 1:2.4 in the separated opacifying particles.

Example 3

The opacifying particles (nanorattles) from Example 2 were compared with a mixture of $TiO_2$ pigment particles and hollow particles in a coating for hiding. Opacifying particles from Example 2 (10 g), which contained 8.7% $TiO_2$ and 20.7% polymer, were mixed with 40 g Rhoplex SG-30 from Dow Chemical, and then drawn down on a black LENETA chart with a 50 μm thick bar and dried at room temperature. Reflectance at 550 nm was measured with Oceanoptics USB2000 for comparison of hiding. In comparison, a first control paint was made by replacing the opacifying particles with a $TiO_2$ slurry of CR-826 while doubling the amount of $TiO_2$ by weight in the paint and a comparative paint was produced using the $TiO_2$ slurry with the pigment extender Ropaque Ultra (from The Dow Chemical Company). As shown in Table 1, the hiding of the paint with the opacifying particles from Example 2 was comparable to the control with double the amount of $TiO_2$ by weight percentage. In the comparative example, the total amount of $TiO_2$ was the same as in the paint with the opacifying particles and exhibited slightly improved hiding by the dried paint. However, as wet films, the opacifying particles provided significantly improved hiding over the comparative example as shown in FIG. 2.

TABLE 1

| Test | Pigment particles | TiO2 wt % in paint | R % @550 nm |
|---|---|---|---|
| Control | $TiO_2$ slurry | 3.6 | 33.3 |
| Example | Opacifying particles | 1.8 | 36.6 |
| Comparative Example | $TiO_2$ slurry + Ropaque Ultra | 1.8 | 48.7 |

Although the present invention has been described with reference to specific details of certain embodiments thereof, it is not intended that such details should be regarded as limitations upon the scope of the invention except insofar as they are included in the accompanying claims.

The invention claimed is:
1. An aqueous dispersion of particles comprising:
 inorganic particles, each particle being at least partially encapsulated by an inner shell, wherein at least a portion of the surface of each particle comprises a coupling agent having a pendent reactive group, and wherein the inner shell is prepared from a reaction of the coupling agent pendent reactive group with an ethylenically unsaturated monomer;
 a first outer shell at least partially encapsulating each inner shell, the first outer shell defining a void; and
 a plurality of second outer polymer shells at least partially encapsulating the first outer shell, wherein the second outer polymer shells are at least partially spaced apart from the first outer shell by the void.
2. The aqueous dispersion of claim 1, wherein the coupling agent comprises a silane coupling agent.
3. The aqueous dispersion of claim 2, wherein the coupling agent pendent reactive group comprises ethylenic unsaturation.
4. The aqueous dispersion of claim 3, wherein the coupling agent comprising ethylenic unsaturation comprises monomers of a $C_1$-$C_{12}$ alkyl ester of (meth)acrylic acid.
5. The aqueous dispersion of claim 2, wherein the silane coupling agent comprises a hydrolysable group which, upon hydrolysis, comprises a residue with free hydroxyl groups present on the inorganic particle surfaces.
6. The aqueous dispersion of claim 2, wherein the outer polymer shells each comprise polystyrene.
7. The aqueous dispersion of claim 2, wherein the inorganic particles comprise titanium dioxide.
8. A coating composition comprising the aqueous dispersion of claim 2.
9. A method of preparing an aqueous dispersion of particles at least partially encapsulated by a polymer, according to claim 1 the method comprising:
 dispersing inorganic particles in an aqueous phase;
 functionalizing at least a portion of the surfaces of the inorganic particles with a monomeric coupling agent, the coupling agent having a pendent reactive group;
 polymerizing the reactive groups on the functionalized particles with a first polymerizable component to produce an inner polymer shell at least partially encapsulating each inorganic particle, wherein the inner polymer shell is prepared from a reaction of the coupling agent pendent reactive group with an ethylenically unsaturated monomer;
 polymerizing a second polymerizable component to form a first outer polymer shell at least partially encapsulating each inner polymer shell;

polymerizing additional polymerizable components to form a plurality of second outer polymer shells at least partially encapsulating each first outer polymer shell; and producing voids within the first outer polymer shell, wherein the second outer polymer shells are at least partially spaced apart from the first outer polymer shell by the voids.

10. The method of claim 9, wherein said step of producing voids comprises (i) expanding the first outer polymer shells and the second outer polymer shells and (ii) shrinking the expanded first outer polymer shells thereby forming the voids within the first outer polymer shells.

11. The method of claim 10, further comprising crosslinking the expanded second outer shells.

12. The method of claim 11, wherein the additional polymerizable component comprises styrene, methyl methacrylate, and/or acrylonitrile.

13. The method of claim 12, wherein the expanded second outer polymer shells comprise an expanded second outer shell comprising polystyrene and another expanded outer second shell comprising cross-linked polystyrene, wherein the other second expanded outer shells at least partially encapsulate the first expanded outer shells.

14. The method of claim 9, wherein the coupling agent comprises a silane coupling agent.

15. The method of claim 14, wherein the coupling agent pendent reactive group comprises ethylenic unsaturation.

16. The method of claim 15, wherein the first polymerizable component comprises ethylenically unsaturated monomers.

17. The method of claim 16, wherein the coupling agent comprising ethylenically unsaturated monomers comprises monomers of a $C_1$-$C_{12}$ alkyl ester of (meth)acrylic acid.

18. The method of claim 14, wherein the silane coupling agent comprises a hydrolysable group which, upon hydrolysis, comprises a residue reactive with free hydroxyl groups present on the inorganic particle surfaces.

* * * * *